US010108685B2

(12) United States Patent
Amdur et al.

(10) Patent No.: US 10,108,685 B2
(45) Date of Patent: Oct. 23, 2018

(54) REMOTE PROVISIONING OF VIRTUAL DATABASES

(71) Applicant: Delphix Corp., Menlo Park, CA (US)

(72) Inventors: Matthew Benjamin Amdur, Cambridge, MA (US); Eric Noah Schrock, Medford, MA (US)

(73) Assignee: Delphix Corp., Menlo Park, CA (US)

( * ) Notice: Subject to any disclaimer, the term of this patent is extended or adjusted under 35 U.S.C. 154(b) by 346 days.

(21) Appl. No.: 14/326,664

(22) Filed: Jul. 9, 2014

(65) Prior Publication Data
US 2015/0019485 A1   Jan. 15, 2015

Related U.S. Application Data

(60) Provisional application No. 61/844,387, filed on Jul. 9, 2013.

(51) Int. Cl.
*G06F 17/30* (2006.01)

(52) U.S. Cl.
CPC .............. *G06F 17/30575* (2013.01)

(58) Field of Classification Search
CPC .................................. G06F 17/30575
See application file for complete search history.

(56) References Cited

U.S. PATENT DOCUMENTS

| | | | |
|---|---|---|---|
| 5,819,292 A | 10/1998 | Hitz et al. | |
| 7,107,385 B2 | 9/2006 | Rajan et al. | |
| 7,225,204 B2 | 5/2007 | Manley et al. | |
| 7,334,094 B2 | 2/2008 | Fair | |
| 7,334,095 B1 | 2/2008 | Fair et al. | |
| 7,340,461 B2 | 3/2008 | Vishlitzky et al. | |
| 7,373,364 B1 | 5/2008 | Chapman | |

(Continued)

FOREIGN PATENT DOCUMENTS

JP     2005532611 A     10/2005

OTHER PUBLICATIONS

Boppana, U., "Using FlexClone to Clone Files and LUNs," NetApp Technical Report, Mar. 2010, 32 Pages.

(Continued)

*Primary Examiner* — Ashish Thomas
*Assistant Examiner* — Dustin D Eyers
(74) *Attorney, Agent, or Firm* — Fenwick & West LLP

(57) ABSTRACT

Database storage systems provide replication capability that allows data of a source database storage system to be replicated to a target database storage system. Virtual databases can be provisioned from the target database system, thereby supporting remote provisioning of virtual databases. The virtual databases on the remote site can be used to perform various operations including read/write of data, refresh, rollback, and so on. Database objects may be deleted on the source database storage system while the corresponding data is used by other entities for example, virtual databases at the target database storage system. The database storage system verifies if an entity being deleted is in use by any other database infrastructure object of the database storage system. A placeholder object maintains the data corresponding to the deleted object. This provides the ability to create geographical distribution networks and support remote provisioning of virtual databases.

22 Claims, 8 Drawing Sheets

(56) References Cited

U.S. PATENT DOCUMENTS

| | | | |
|---|---|---|---|
| 7,386,695 B2 | 6/2008 | Fuente | |
| 7,409,511 B2 | 8/2008 | Edwards et al. | |
| 7,457,982 B2 | 11/2008 | Rajan | |
| 7,484,070 B1* | 1/2009 | Walton | G06F 12/023 711/100 |
| 7,539,836 B1 | 5/2009 | Klinkner | |
| 7,577,681 B1* | 8/2009 | Rozenman | G06F 17/30595 |
| 7,587,563 B1 | 9/2009 | Teterin et al. | |
| 7,590,660 B1 | 9/2009 | Richards et al. | |
| 7,631,021 B2 | 12/2009 | Sarma et al. | |
| 7,743,035 B2 | 6/2010 | Chen et al. | |
| 7,757,056 B1 | 7/2010 | Fair | |
| 7,822,758 B1 | 10/2010 | Prakash et al. | |
| 7,827,366 B1 | 11/2010 | Nadathur et al. | |
| 7,856,424 B2 | 12/2010 | Gisler et al. | |
| 7,877,357 B1 | 1/2011 | Wu et al. | |
| 7,937,547 B2 | 5/2011 | Liu et al. | |
| 7,941,470 B2 | 5/2011 | Le et al. | |
| 7,996,636 B1 | 8/2011 | Prakash et al. | |
| 8,037,032 B2 | 10/2011 | Pershin et al. | |
| 8,150,808 B2 | 4/2012 | Zha et al. | |
| 8,280,858 B2 | 10/2012 | Ahrens et al. | |
| 8,311,988 B2 | 11/2012 | Cisler et al. | |
| 8,532,973 B1 | 9/2013 | CaraDonna et al. | |
| 8,775,663 B1 | 7/2014 | Singh | |
| 8,880,687 B1* | 11/2014 | Chandrachari | H04L 43/065 709/224 |
| 9,047,312 B1* | 6/2015 | Ten-Pow | G06F 17/3023 |
| 2002/0083037 A1 | 6/2002 | Lewis et al. | |
| 2005/0246503 A1* | 11/2005 | Fair | G06F 17/30067 711/147 |
| 2008/0307345 A1 | 12/2008 | Hart et al. | |
| 2009/0222496 A1 | 9/2009 | Liu et al. | |
| 2011/0093435 A1* | 4/2011 | Zha | G06F 17/30566 707/639 |
| 2014/0032829 A1* | 1/2014 | Solihin | G11C 7/1072 711/105 |

OTHER PUBLICATIONS

Creek, T., "Applications for Writeable LUNs and LUN Cloning in Oracle Environments," NetApp, Technical Report, Jun. 2003, 10 Pages.

Degwekar, A., "Using SnapMirror with SnapDrive for UNIX," NetApp Technical Report, 2007, 11 Pages.

Gmane, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.

Gmane, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.openolaris.zfs/194/match=clone>.

Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmaneorg/gmane.os.solaris.ogensolaris.zfs/224/match=cloning>.

Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.ogensolaris.zfs/229/match=zfs+clone+promotion>.

Gmane, Discussion regarding "ZFS snapshot improvement," From the zfs-discuss@opensolaris.org mailing list, May 10, 2006, 1 Page, Can be retrieved at <URL:http://article.gmane.org/gmane.os.solaris.openolaris.zfs/232/match=snapshot>.

Gmane, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.

Higgins, B., et al., "Backup and Recovery Snap Manager for SQL Server," DLA PIPER, Nov. 2008, 37 Pages.

Hitz, D., et al., "File System Design for an NFS File Server Appliance," Technical Report, USENIX, Winter 1994, 23 Pages.

Jackson, J., "ZFS: The future for storage networks?; File system has massive capacity, but licensing issues and architectural concerns persist," Government Computer News, Media, Inc., Jun. 25, 2007, 2 Pages.

Kay, D., "Working with ZFS Snapshots," Solaris 10 How-To Guides, Version 1.0, Sun Microsystems, Inc., Jan. 5, 2009, 8 Pages.

Kilvansky, M., "A Thorough Introduction to FlexClone Volumes," NetApp, Technical White Paper, Oct. 2004, 35 Pages.

Lal, J., et al., "DB2: Cloning a Database using NetApp FlexClone Technology," NetApp, Apr. 30, 2006, 60 Pages.

Merrill, J., et al., "SnapVault Best Pratices Guide," NetApp Technical Report, 2008, 29 Pages.

Nadgir, N., "Databases and ZFS," Oracle Blog, Sep. 25, 2006, 8 Pages, Can be retrieved from <URL:https://blog.oracle.com/realneel/entry/zfs_and_databases>.

Network Appliance, Inc., "Data ONTAP 7.2 Commands: Manual Page Reference, vol. 1," May 16, 2008, 615 Pages.

Network Appliance, Inc., "NetApp Data Management for Decision Support Systems," 2005-2010, 4 Pages.

Network Appliance, Inc., "Flexvol and Flexclone Software," 2006, 2 Pages.

Network Appliance, Inc., "SnapManager 3.0 for Oracle Installation and Administration Guide," Nov. 2008, 294 Pages.

Network Appliance, Inc., "SnapManager 2.2 for Oracle Installation and Administration Guide," Nov. 2007, 310 Pages.

Network Appliance, Inc., "SnapManager 5.0 for Microsoft SQL Server Installation and Administration Guide," Oct. 2008, 492 Pages.

Network Appliance, Inc., "Network Appliance Snapmirror Software," 2006, 2 Pages.

Oracle, "Oracle Database Backup and Recovery User's Guide," 11g Release 1(11.1), Aug. 2008, 598 Pages.

Osuna, A., "An Introduction to FlexClone Volumes" Redbooks, IBM, 2006, 50 Pages.

Osuna, A., "Using IBM DB2 UDB with IBM System Storage N series" Redbooks, IBM, Dec. 2006, 136 Pages.

Osuna, A., "Data Protection Strategies in IBM System Storage N Series" Redbooks, IBM, Jun. 2008, 90 Pages.

Osuna, A., "IBM System Storage N Series SnapMirror" Redbooks, IBM, Jul. 2006, 124 Pages.

Osuna, A., "IBM System Storage N Series SnapVault Best Practices Guide" Redbooks, IBM, 2007, 54 Pages.

Patel, D., et al., "Rapid Database Development and Deployment," NetApp White Paper, Mar. 2007, 11 Pages.

Patterson, H., et al., "SnapMirror: File System Based Asynchronous Mirroring for Disaster Recovery," USENIX Association, Proceedings of the FAST 2002 Conference on File and Storage Technologies, Jan. 28-30, 2002, 14 Pages.

Schuettinger, S., "NetApp Technical Report—Rapid Deployment of Oracle Database 11g Using VMWare Infrastructure and NetApp Flexclone," NetApp, Jan. 2008, 24 Pages.

Schuettinger, S., "Helping DBAs Become More Efficient NetApp Efficiency and Manageability Advantages," NetApp White Paper, Jul. 2009, 12 Pages.

Sun Microsystems, Inc., "ZFS the File System of the Future," 19 Pages. [Publication date is unknown].

Sun Microsystems, Inc., "Solaris ZFS Administration Guide," Aug. 2006, 164 Pages.

Sun Microsystems, Inc., "Solaris ZFS Administration Guide," Mar. 2009, 292 Pages.

Sun Microsystems, Inc., "System Administration Guide: Virtualization Using the Solaris Operating System," Oct. 2009, 562 Pages.

Syncsort Incorporated, "Near-Instant Oracle Cloning with Syncsort AdvancedClient Technologies," Syncsort, White Paper, 2007, 12 Pages.

Syncsort Incorporated, "Syncsort Backup Express Advanced Recovery for NetApp," Syncsort, 2008, 12 Pages.

(56) References Cited

OTHER PUBLICATIONS

Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," Paul's Blog 3.0 (Release Candidate), Oracle, 2007, 5 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, Microsoft Developer's Network, "Pages and Extents," Microsoft Corporation ("Pages and Extents") Sep. 2007, 2 Pages.
Mullins, "Excerpts of DB2 Developer's Guide, Fifth Ed." May 2004, 5 Pages.
NETAPP, 2007 NetApp, Inc., Data ONTAP 7.1 Data Protection Online Backup and Recovery Guide, NetApp Technical Doc, Jan. 12, 2007, pp. 508.
NETAPP, "Datasheet FlexClone," NetApp Technical Doc, 2008, 2 Pages.
NETAPP, "Datasheet FlexVol™ and FlexClone™ Software," NetApp Technical Doc, 2004, 2 Pages.
NETAPP, "Datasheet Netapp SnapManager for Oracle," NetApp Technical Doc, 2008, 2 Pages.
NETAPP, "Datasheet NetApp SnapMirror," NetApp Technical Doc, 2008, 2 Pages.
NETAPP, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
Vmware, Inc. and EMC Corporation, "Accelerate Oracle Database log Creation and Deployment Using VMware Infrastructure and EMC Celerra Writeable Checkpoints," Mar. 2008, 16 Pages.
Vmware, Inc. and IBM "Using IBM® TotalStorage® Enterprise Storage Server® FlashCopy® Function with the VMware ESX 2.5 Server ("ESX IBM")," Sep. 1, 2005, 25 Pages.
Vmware, Inc., "Using Clones to Streamline Development ("Ws5 Clones")," 2005, 9 Pages.
Vmware, Inc., "Using VMware Infrastructure for Backup and Restore ("Esx3")," 2006, 20 Pages
Vmware, Inc., "Workstation 5 User's Manual ("WS5 Manual")," 2006, 492 Pages.
Declaration of Erez Zadok in Support of Petition for Inter Partes Review of U.S. Pat. No. 8,161,077, dated Oct. 6, 2014, 87 Pages.
Declaration of Erez Zadok in Support of Petition for Inter Partes Review of U.S. Pat. No. 8,161,077, dated Oct. 6, 2014, 95 Pages.
Declaration of Erez Zadok in Support of Petition for Inter Partes Review of U.S. Pat. No. 8,468,174, dated Oct. 23, 2014, 98 Pages.
Declaration of Erez Zadok in Support of Petition for Inter Partes Review of U.S. Pat. No. 8,468,174, dated Oct. 23, 2014, 99 Pages.
Declaration of Erez Zadok in Support of Petition for Inter Partes Review of U.S. Pat. No. 8,566,361, dated Oct. 21, 2014, 99 Pages.
Declaration of Erez Zadok in Support of Petition for Inter Partes Review of U.S. Pat. No. 8,566,361, dated Oct. 21, 2014, 84 Pages.
Declaration of Erez Zadok in Support of Petition for Inter Partes Review of U.S. Pat. No. 8,150,808, dated Oct. 2, 2014, 85 Pages.
Declaration of Erez Zadok in Support of Petition for Inter Partes Review of U.S. Pat. No. 8,150,808, dated Oct. 2, 2014, 78 Pages.
Declaration of Erez Zadok in Support of Petition for Inter Partes Review of U.S. Pat. No. 8,150,808, dated Oct. 2, 2014, 84 Pages.
Declaration of Erez Zadok in Support of Petition for Inter Partes Review of U.S. Pat. No. 8,150,808, dated Oct. 6, 2014, 97 Pages.
Declaration of Erez Zadok in Support of Petition for Inter Partes Review of U.S. Pat. No. 8,548,944, dated Oct. 7, 2014, 98 Pages.
Declaration of Erez Zadok in Support of Petition for Inter Partes Review of U.S. Pat. No. 8,548,944, dated Oct. 8, 2014, 98 Pages.
Petition for Inter Partes Review of U.S. Pat. No. 8,161,077, dated Oct. 6, 2014, 62 Pages.
Petition for Inter Partes Review of U.S. Pat. No. 8,161,077, dated Oct. 6, 2014, 65 Pages.
Petition for Inter Partes Review of U.S. Pat. No. 8,468,174, dated Oct. 23, 2014, 64 Pages.
Petition for Inter Partes Review of U.S. Pat. No. 8,566,361, dated Oct. 21, 2014, 66 Pages.
Petition for Inter Partes Review of U.S. Pat. No. 8,150,808, dated Oct. 3, 2014, 65 Pages.
Petition for Inter Partes Review of U.S. Pat. No. 8,150,808, dated Oct. 3, 2014, 61 Pages.
Petition for Inter Partes Review of U.S. Pat. No. 8,150,808, dated Oct. 7, 2014, 65 Pages.
Petition for Inter Partes Review of U.S. Pat. No. 8,548,944, dated Oct. 8, 2014, 66 Pages.
Petition for Inter Partes Review of U.S. Pat. No. 8,548,944, dated Oct. 8, 2014, 65 Pages.
Sadagopan, P., et al., "Oracle Fusion Middleware DR Solution Using NetApp Storage," NetApp Technical Report, May 2008, 38 Pages.
Notice of Grounds for Rejection for Japanese Patent Application No. P2014-155597, dated Apr. 21, 2015, 5 Pages.
Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).
Final Written Decision, Before the Patent Trial and Appeal Board of United States Patent and Trademark Office, Case IPR2015-00034, U.S. Pat. No. 8,150,808 B2, dated Apr. 16, 2016, 100 Pages.
Final Written Decision, Before the Patent Trial and Appeal Board of United States Patent and Trademark Office, Case IPR2015-00128, U.S. Pat. No. 8,468,174 B1, dated Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, dated Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, dated Apr. 13, 2016, 107 Pages.
Final Written Decision, Before the Patent Trial and Appeal Board of United States Patent and Trademark Office, Case IPR2015-00014, U.S. Pat. No. 8,150,808 B2, dated Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, dated Apr. 12, 2016, 94 Pages.
Final Written Decision, Before the Patent Trial and Appeal Board of United States Patent and Trademark Office, Case IPR2015-00052, U.S. Pat. No. 8,548,944 B2, dated Mar. 31, 2016, 25 Pages.
Final Written Decision, Before the Patent Trial and Appeal Board of United States Patent and Trademark Office, Case IPR2015-00050, U.S. Pat. No. 8,548,944 B2, dated Mar. 31, 2016, 26 Pages.
Final Written Decision, Before the Patent Trial and Appeal Board of United States Patent and Trademark Office, Case IPR2015-00108, U.S. Pat. No. 8,566,361 B2, dated Apr. 29, 2016, 61 Pages.
Final Written Decision, Before the Patent Trial and Appeal Board of United States Patent and Trademark Office, Case IPR2015-00108, U.S. Pat. No. 8,566,361 B2, dated May 11, 2016, 57 Pages.

* cited by examiner

REMOTE PROVISIONING OF VIRTUAL DATABASES

CROSS REFERENCES TO RELATED APPLICATIONS

This application claims the benefit of U.S. Provisional Patent Application No. 61/844,387 filed Jul. 9, 2013, which is incorporated by reference in its entirety.

BACKGROUND

Field of Art

This invention relates generally to storage efficient database management systems and in particular to remote provisioning of virtual databases for storage efficient database management systems.

Description of Related Art

Databases store the data that is critical to an organization and thus form an important part of an organization's information technology infrastructure. As a result organizations typically maintain multiple copies of the data of the databases. For example, the data stored in a database system may be replicated to a target database system. Conventional databases support limited functionality using the replicated database system. For example, typically the target database system is used when a failure occurs in the source database system. Accordingly, the target database system is used in a passive mode in which the data of the target system is not used unless the source database system fails. This imposes significant limitations in the use of the target system. For example, if a database administrator needs to figure out whether a disaster recovery plan is working, the database administrator has to stop the replication and run a test. These limitations prohibit use of several useful topologies between primary and secondary database systems.

SUMMARY

Embodiments allow remote provisioning of virtual databases. Database storage systems stores snapshots of data received from source databases. A snapshot represents data received from a source database at a point in time. The database storage systems store database infrastructure object representing entities associated with database blocks, for example, entities representing snapshots, source databases, or virtual databases. A source database storage system replicates data to a target database storage system. A first database infrastructure object of the source database system is replicated as a second database infrastructure object of the target database storage system. The target database system further creates one or more database infrastructure objects dependent on the second database infrastructure object. For example, the second database infrastructure object may represent a source database and a created database infrastructure object may represent a virtual database provisioned from the source database. These database infrastructure objects are marked as active. The source database storage system receives a request to delete the first database infrastructure object. The target database storage system verifies whether any active database infrastructure object depends on the second database infrastructure object. If there is at least one active database infrastructure object dependent on the second database infrastructure object, the target database storage system marks the second database infrastructure object as inactive so as to prevent reclamation of storage space of database blocks associated with the inactive second database infrastructure object.

In an embodiment, if the target database system determines that there are no active database infrastructure objects depending on the second database infrastructure object, the target database system reclaims the database blocks corresponding to the second database infrastructure object.

The features and advantages described in this summary and the following detailed description are not all-inclusive. Many additional features and advantages will be apparent to one of ordinary skill in the art in view of the drawings, specification, and claims hereof.

Figure 1:
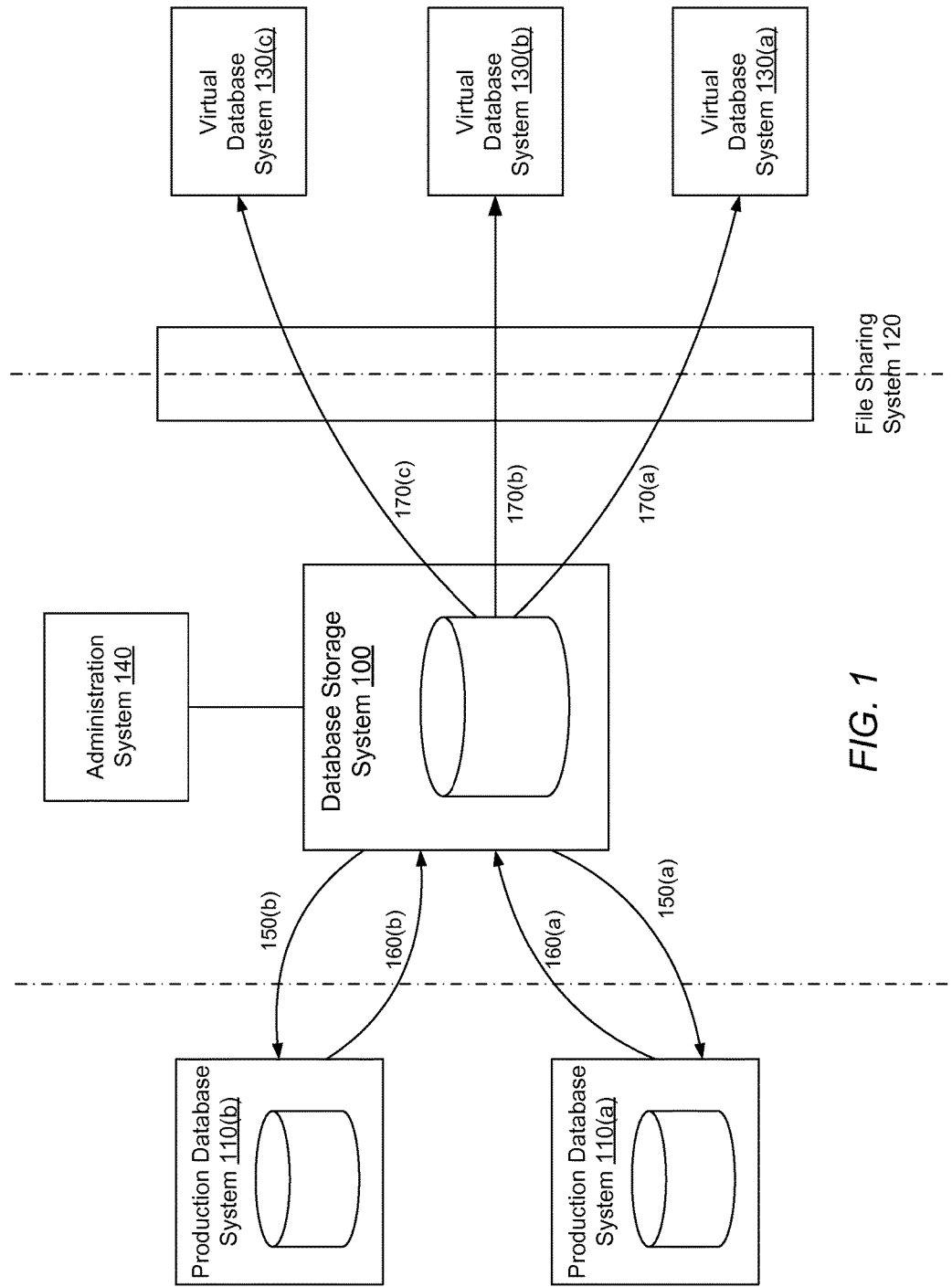
FIG. 1 is diagram illustrating how information is copied from a production database to a database storage system and provisioned as virtual databases using a file sharing system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A database storage system receives and stores data blocks corresponding to multiple point-in-time copies of a source database. The data from the data storage system is replicated into a remote database storage system. The first database system is called a source database storage system and the remote database storage system is called a target database storage system. Changes made to the source database storage system are propagated to the target database storage system.

In conventional systems, where a source data store is replicated to a target data store, using the target data store instead of the source data store typically requires stopping the replication process for products offered by several vendors. This is so because conventional systems are set up for disaster recovery and the secondary data store is used typically when the primary data store fails and the replication stream from the primary data store to the secondary data store breaks as a result. Accordingly, conventional systems do not support updates to the secondary data store while the replication from the primary store continues.

Embodiments allow the target database storage system to be used without requiring the replication stream of data from the source database storage system to the target storage system to be stopped. This allows virtual databases to be provisioned from the target database storage system and used while the replication from the source database storage system to the target database storage system continues. For example, there may be virtual databases provisioned using the secondary database storage system that are used by clients for reading data as well as making updates to the data while data is being replicated from the source database storage system to the target database storage system. Virtual database systems are described in U.S. patent application Ser. No. 12/603,541 filed on Oct. 21, 2009, now issued as U.S. Pat. No. 8,150,808, which is incorporated by reference herein in its entirety.

Accordingly, embodiments allow geographically distributed data sources. For example, the source database storage system may be located in a city, for example, San Francisco whereas the target database storage system may be located in another city, for example, New York. The data from the source database storage system may be replicated to multiple target database storage system each located in a different city, for example, a target database storage system may be located in London, U.K., another target database storage system may be located in Los Angeles, Calif., and a third target database storage system may be located in Denver Colo. The source database storage system receives point-in-time copies of data from one or more source databases, for example, production database systems. The data of the source database storage system is continuously replicated to each target database storage system while the target database storage system is in use, for example, to provision virtual databases. The ability to provision VDBs at the remote database storage system is referred to as remote provisioning.

Both the source database storage system and the target database storage system can provision multiple VDBs that share database blocks. If a VDB writes to a database block, a copy of the database block is made to which the updates are made. However, database blocks that are not updated can be shared among multiple VDBs, thereby allowing new VDBs to be created without requiring large amount of data to be copied. Furthermore, the amount of storage required for storing each VDB is small.

Different types of database infrastructure objects are maintained at both the source database storage system and the target database storage system. A database infrastructure object represents an entity of the database storage system that is associated with database blocks stored on the database storage system. Examples of database infrastructure object include point-in-time copies of source databases (also referred to herein as snapshots), representations of source database system, VDBs, representations of log files, and so on.

VDBs may be provisioned using a source database or another VDB. For example, a first VDB may be created and some of the database blocks of the VDB changed. Later a second VDB may be provisioned using a particular state of the first VDB. The updates to the second VDB may be different from the updates to the first VDB. For example, the second VDB may be used by a different application compared to the first VDB.

A problem encountered with remote provisioning is that a database infrastructure object may be deleted from the source database storage system while it is still being used in a target database storage system. For example, a point-in-time copy (say PIT1) may be deleted from the source database system or a representation of a source database in the database storage system may be deleted (for example, if the source database is renamed, or moved to a different server, or removed). However, a remote target database storage system may have provisioned a VDB based on the database infrastructure object. Therefore, the target database system maintains information to determine whether a virtual database or any database infrastructure object depends on another database infrastructure object. This allows the target database system to determine whether to keep database blocks corresponding to a database infrastructure object at the target database system in spite of deletion of the corresponding database infrastructure object at the source database system. However, if the target database system determines that no other database infrastructure objects need to use the database blocks of the database infrastructure object being deleted, the target database system deletes the database infrastructure object and reclaims the storage space used by the database blocks of the database infrastructure object (so they can be reused by other database infrastructure objects).

Accordingly, embodiments allow remote provisioning of VDBs on target storage database systems without having to stop the replication from the source database storage system to the target database system. The replication stream from the source database storage system to the target database system can continue. Furthermore, the actions taken on the source database storage system can continue including any updates to the data as well as deletion of database infrastructure objects at the source database storage system.

Virtual Database Systems

In certain embodiments of the invention, one or more virtual databases are created based on the state of a production database or another virtual database at a particular point in time. The virtual databases created can be individually accessed and modified as desired. A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like.

In one embodiment, information from the production database is copied to a storage system at various times, such as periodically. This enables reconstruction of the database files associated with the production database for these different points in time. The information may be managed in the storage system in an efficient manner so that copies of information are made only if necessary. For example, if a portion of the database is unchanged from a version that was previously copied, that unchanged portion need not be copied. A virtual database created for a point in time is stored as a set of files that contain the information of the database as available at that point in time. Each file includes a set of database blocks and the data structures for referring to the database blocks.

A virtual database may be created on a database server by creating the database files for the virtual database corresponding to the state of the production database at a previous point in time. The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. Multiple VDBs can be provisioned based on the state of the production database at the same point in time. On the other hand, different VDBs can be based on different point in time state of the same production database or different production databases. VDBs may also be based on other VDBs.

The database server on which a virtual database has been provisioned can read from and write to the files stored on the storage system. A database block may be shared between different files, each file associated with a different VDB. In particular, a database block is shared if the corresponding virtual database systems 130 are only reading the information in the database block and not writing to the database block. In one embodiment, the virtual database manager 375 makes copies of the database blocks only if necessary. For example, a particular database block may be shared by multiple VDBs that read from the same database block. But if one of virtual database systems 130 attempts to write to the database block, a separate copy of the database block is made because the writing operation causes that database block to be different for the VDB corresponding to that virtual database systems 130 than it is for the other VDBs.

FIG. 1 shows one embodiment illustrating how information may be copied from a production database to a database storage system and provisioned as virtual databases using a file sharing system. The production database systems 110 manage data for an organization. In some embodiments information may be copied from storage level snapshots of production databases or clones of production databases instead of a live production database. The database storage system 100 retrieves data associated with databases from one or more production database systems 110 and stores the data in an efficient manner, further described below. A database administrator user interface 140 allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The request 150 is sent periodically and the production database system 110 responds by sending information representing changes of data stored in the production database since the last response 160 sent by the production database system 110. The database storage system 100 receives the data 160 sent by the production database system 110 and stores the data. The database storage system 100 stores the information efficiently, for example, by keeping versions of database blocks that have changed and reusing database blocks that have not changed.

To create a virtual database, the database storage system 100 creates files that represent the information corresponding to the production database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

Remote Provisioning

Figure 2:
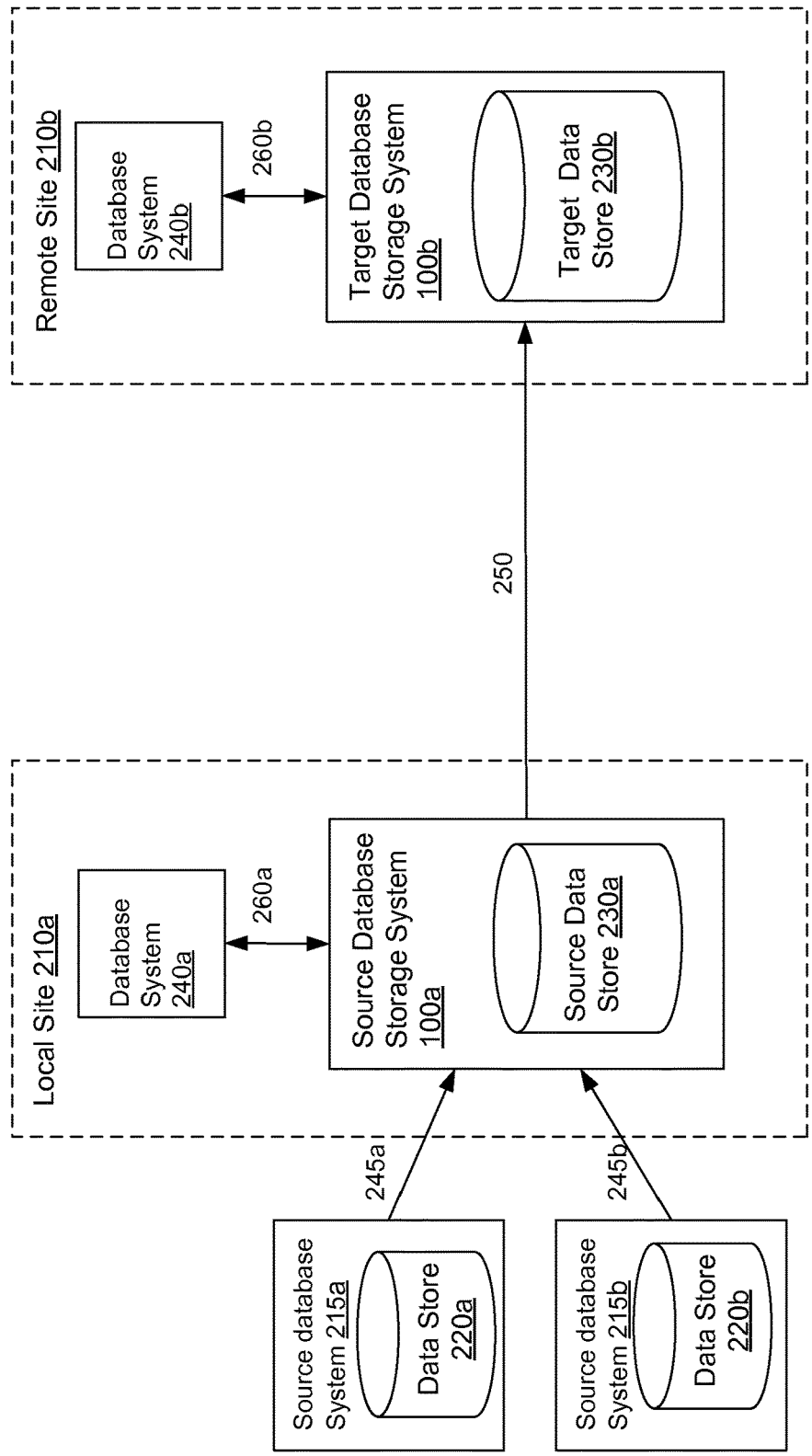
FIG. 2 illustrates the overall system environment that allows remote provisioning of virtual databases according to an embodiment.

FIG. 2 illustrates the overall system environment that allows remote provisioning of virtual databases according to an embodiment. There are two sites that store database storage systems. The local site 210a comprises the source database storage system 230a and the remote site 210b comprises the target database storage system 230b. There may be one or more source database systems 215 that include data stores 220. The source database system 215a includes data store 220a and the source database system 215b includes the data store 220b. The changes to the data stores 220 of the source database systems 215 are periodically received 245 by the source storage database system 100a and stored in the source data store 230a. A database system 240a may create virtual databases in the source database storage system 100a and read/write 260a to the VDB.

Information describing changes to data in the source database storage system 100a is transmitted 250 to the target storage database system 100b. These comprise the changed data blocks since the last time the data was transmitted from the source database storage system 100a is transmitted 250 to the target storage database system 100b. The changes to the data in the source database storage system 100a may be transmitted 250 periodically or based on a predetermined schedule. A database system 240b may create virtual databases in the target database storage system 100b and read/write 260b to the VDB. The updates to the source database storage system based on information received 245a as well as any operations performed by users or system administrators can be performed as the information is transmitted 250 from the source database storage system 100a to the target database storage system 100b and as the VDBs created in the target database storage system 100b are used by database systems 240b.

In an embodiment, the transmission 250 of the information from the source database storage system 100a to the target database storage system 100b comprises changed data blocks of the source database storage system 100a. The source database storage system 100a may wait for the system to reach a consistent state before performing the transmission 250 of information. The rate at which the data is transmitted 250 from the source database storage system 100a to the target database storage system 100b is typically independent of the rate at which data is received 245 by the source database storage systems 225 from source database systems 215. The rate at which changes made to the source database storage system are propagated to the target database storage system may be configurable, for example, by a system administrator.

In an embodiment, the database storage systems 225 transmit 250 data based on a replication policy. For example, a replication policy may specify that data is replicated after a fixed time period, for example, every 15 minutes or every hour, or once every day at a particular time. The replication is performed for both data and metadata stored in the database storage system. The data stored in the database storage system corresponds to the database blocks received from the source database system. The metadata stored in the database storage system includes database infrastructure objects comprising information describing entities represented in the database storage system including point-in-time copies, VDBs, source database systems, log files received from the source database system, and so on. The metadata describing various database infrastructure objects of the database storage system 225 may describe information corresponding to each entity represented by the database infrastructure object, for example, type and version of a source database, type and version of the operating system of the system running the source database system, and so on.

A system administrator of a target database storage system 100b may be presented with a user interface describing the database infrastructure objects (source databases, point-in-time copies, VDBs etc.) of the source database storage system 100a that are being replicated to the target database storage system 100b. For example, the system administrator of the target database storage system 100b may create a VDB based on a point-in-time copy of a source database replicated from the source database storage system 100a. Similarly, the system administrator of the target database storage system 100b may create a VDB based on another VDB replicated from the source database storage system 100a.

Embodiments allow database infrastructure objects to be manipulated in the source database storage system 100a while they are in use in the target database storage system 100b. Changes that add new objects at the source database storage system 100a are implemented by replicating the newly created objects to the target database storage system 100b. However, deletes of database infrastructure objects in the source database storage system 100a require maintenance of additional information as described herein.

For example, a VDB may be created using a point-in-time copy of a source database in the target database storage system 100b. A system administrator of the source database storage system 100a may delete that point-in-time copy of the source database. The database storage system 225 allows the VDB created in the target database storage system 100b to function in spite of the corresponding point-in-time copy of the source database being deleted from the source database storage system 100a. Alternatively, the database infrastructure object representing the source database in the source database storage system 100a may be deleted but the VDB created in the target database storage system 100b based on that source database is allowed to function and has access to all the relevant database blocks.

Deletes of database infrastructure objects may be performed by a system administrator, for example, by using a user interface presented to the system administrator by the database storage system 100. Deletes of database infrastructure objects may be performed to manage available storage space of the database storage system 100. For example, if a system administrator believes that a source database is not being used to provision VDBs, the system administrator may delete the source database. The database storage system 100 may allow periodic deletes of database infrastructure objects based on certain retention policy. Deleting database infrastructure objects periodically based on a retention policy is a common scenario in which database infrastructure objects are deleted on a regular basis. Typically deletes may be allowed only if a database infrastructure object is not in use at the database storage system 100. However, if remote provisioning is supported, a database infrastructure object may not be in use at the source database storage system 100a but may be used in a remote target database storage system 100a.

System Architecture

Figure 3:
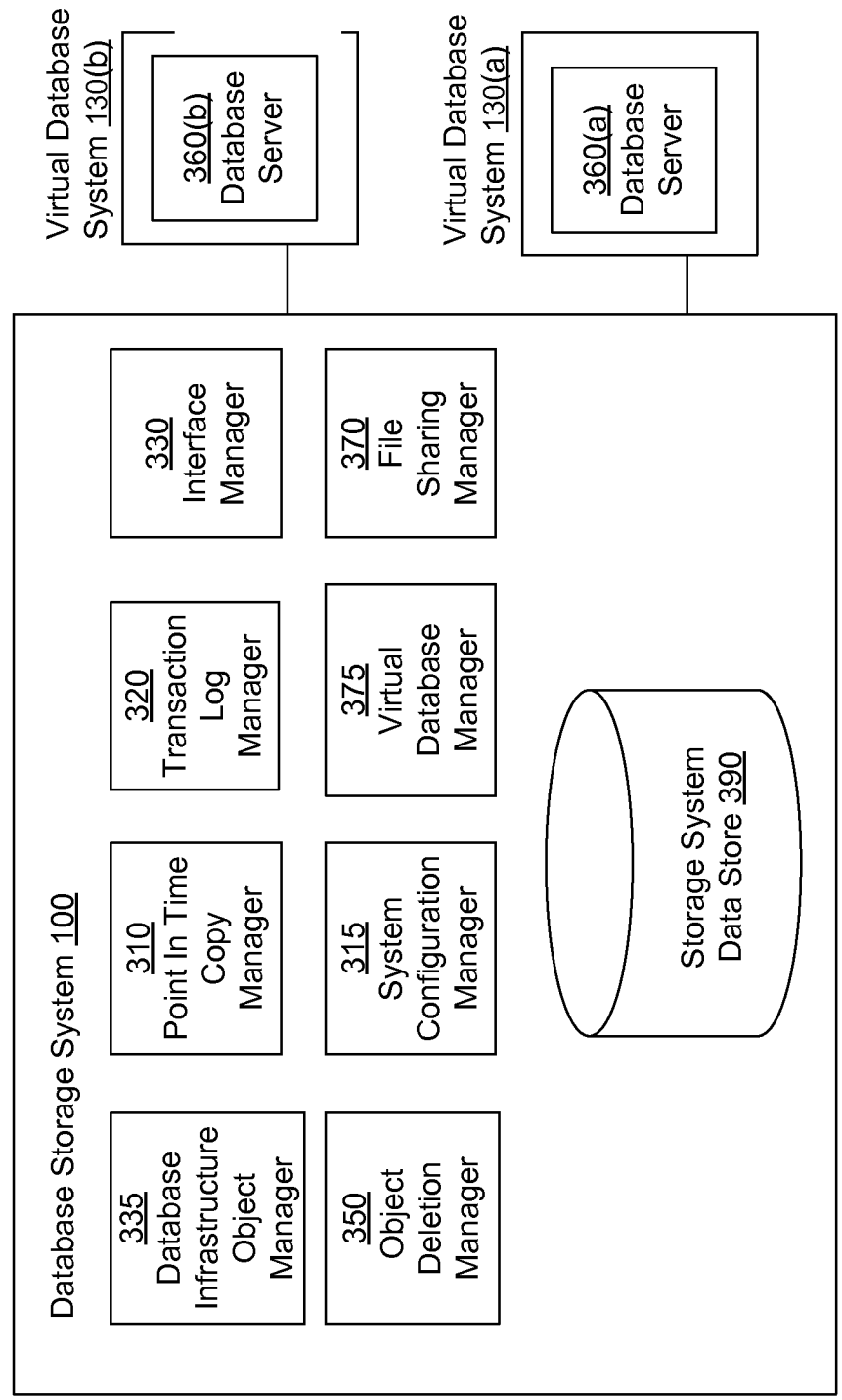
FIG. 3 is a diagram of the architecture of a system that makes storage efficient copies of information from a production database and provisions virtual databases, in accordance with an embodiment of the invention.

FIG. 3 shows a high level block diagram illustrating a system environment suitable for making storage efficient copies of information from a production database and provisioning one or more virtual databases using that information. The system environment comprises a database storage system 100, and one or more virtual database systems 130. Systems shown in FIG. 3 can communicate with each other if necessary via a network. FIG. 3 does not illustrate other systems that may be used for example, a production database system 110 or an administration system 140.

The database storage system 100 retrieves information available in the production database systems 110 and stores it. The information retrieved includes database blocks comprising data stored in the database, transaction log information, metadata information related to the database, information related to users of the database and the like. The information retrieved may also include configuration files associated with the databases. For example, databases may use vendor specific configuration files to specify various configuration parameters including initialization parameters associated with the databases.

The data stored in the storage system data store 390 can be exposed to a virtual database system 130 allowing the virtual database system 130 to treat the data as a copy of the production database stored in the production database system 110. The database storage system 100 includes a point-in-time copy manager 310, a transaction log manager 320, a interface manager 330, a system configuration manager 315, a file sharing manager 370, a virtual database manager 375, a database infrastructure object manager 335, an object deletion manager 350, and a storage system data store 390. In alternative configurations, different and/or additional modules can be included in the database storage system 100.

The point-in-time copy manager 310 interacts with the production database system 110 by sending a request to the vendor interface module 335 to retrieve information representing a point-in-time copy (also referred to as a "PIT copy" or a snapshot) of a source database of the production database system 110. The point-in-time copy manager 310 stores the data obtained from the production database system 110 in the storage system data store 390. The data retrieved by the point-in-time copy manager 310 corresponds to database blocks (or pages) of the database being copied from the production database system 110. After a first PIT copy request to retrieve information from the production database system 110, a subsequent PIT copy request may need to retrieve only the data that changed in the source database since the previous request.

The transaction log manager 320 sends request to the production database system 110 for retrieving portions of the transaction logs stored in the production database system 110. The data obtained by the transaction log manager 320 from the production database system 110 is stored in the storage system data store 390. In one embodiment, a request for transaction logs retrieves only the changes in the transaction logs in the production database system 110 since a previous request for the transaction logs was processed. The database blocks retrieved by a point in time copy manager 310 combined with the transaction logs retrieved by the transaction log manager 320 can be used to reconstruct a copy of a database in the production system 110 corresponding to point in time in between the times when point-in-time copies are made.

The file sharing manager 370 allows files stored in the storage system data store 390 to be shared across computers that may be connected with the database storage system 100 over the network. The file sharing manager 370 uses the file sharing system 120 for sharing files. Sharing a file stored in the storage system data store 390 using the file sharing manager 370 allows a remote computer, for example, the virtual database systems 130 to access the data in the shared file. A remote system may be able to read and write from/to the file shared by the storage system data store 390.

The virtual database manager 375 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 375 creates the necessary files corresponding to the virtual database being created and shares the files with the virtual database system 130. The database administrator for a virtual database system 130 may be different from a database administrator for the production database system 110.

The database infrastructure object manager 335 manages the creation and maintenance of database infrastructure objects (e.g., groups, containers, timeflows, or snapshots) as well as the logical relationship between database infrastructure objects (e.g., groups, containers, timeflows, or snapshots). In particular, database infrastructure object manager 335 manages the parent-child relationship between pairs of database infrastructure objects and defines dependencies between pairs of database infrastructure objects. A snapshot represents a point in time copy representing data of a source database or another virtual database at a point in time. Two snapshots may share database blocks. In an embodiment, a snapshot stores changed database blocks since the previous snapshot was taken and reuses the database blocks of the previous snapshot that were not changed since the previous snapshot was taken. A container represents a metadata for a source database or a virtual database along with timeflow information. The timeflow information comprises information describing changes made to the source database or the virtual database, for example, the information identifying various snapshots or changed logs for the source database or the virtual database. A group represents a collection of other data infrastructure objects.

The object deletion manager 350 manages the deletion of one or more database infrastructure objects. In particular, if a parent database infrastructure object is deleted (e.g., expunged because of a retention policy or by explicit user deletion), object deletion manager 350 manages the creation, insertion, and maintenance of a placeholder object to replace the deleted parent database infrastructure object if the parent database infrastructure object has one or more active objects that depend from it.

In an embodiment, policies can be defined by a database administrator and stored in the system configuration manager 315 for various operations associated with the loading of point-in-time copies from production database systems 110, loading of transaction logs from the production database systems 110, purging of information from the database storage system 100 including point-in-time copies of databases and transaction log information, provisioning of virtual database systems, and replication of data from the database storage system to remote database storage system. A policy specifies rules for executing the specific operation. For example, a policy may specify the operation to be executed based on a predetermined schedule. A policy may determine when to purge PIT copies stored in the database storage system 100 based on number of PIT copies that have been accumulated for a production database. A policy may measure storage availability to determine when to purge information. For example, if the amount of storage available reaches below a threshold level, old PIT copies of selected databases may be purged. The policy may also specify priority of production databases to be used before purging information, for example, low priority database information is purged before purging high-priority database information. In a particular workflow scenario, a policy may determine when to obtain new information from a production database and automatically update VDB information and provision the updated VDB based on the new information.

A virtual database system 130 includes a database server 360. The database server 360 is similar in functionality to the database server 345 and is a computer program that provides database services and application programming interfaces (APIs) for managing data stored on a data store 350. The data managed by the database server 360 may be stored on the storage system data store 390 that is shared by the database storage system 100 using a file sharing system 120. In alternative configurations, different and/or additional modules can be included in a virtual database system 130.

Figure 4:
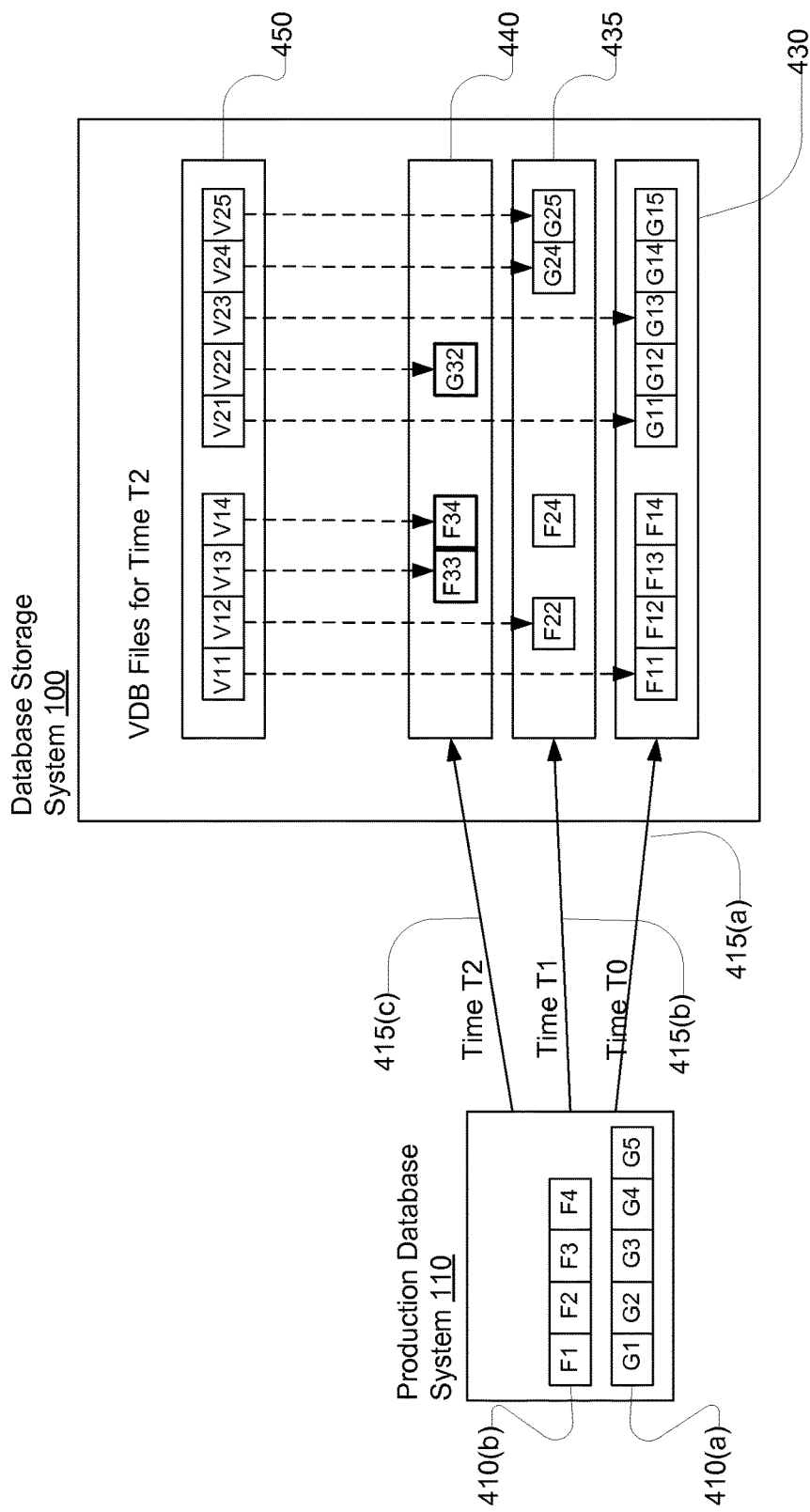
FIG. 4 illustrates a structure of data stored in a virtual database according to an embodiment of the invention.

FIG. 4 indicates how storage efficient copies are made to create a read/write file structure representing a VDB. As shown in FIG. 4, the structures 410 represent the files corresponding to a database on the production database system 110. The structures Fi and Gi represent database blocks stored in the files 410 respectively (Fi refers to F1, F2, F3, . . . and similarly Gi refers to G1, G2, G3, . . . ). The arrows 415 represent the process of making PIT copies at different time points Ti. The first PIT copy 430 made at time T0 needs to copy all the necessary database blocks of the database. For example, F1i represents a copy of block Fi and block G1i represents a copy of block Gi. The PIT copy 435 made at time T1 copies only the blocks that changed since the last PIT copy and may copy much less data compared to the first PIT copy. Similarly at time T2 another PIT copy 440 is made copying the database blocks that changed since the previous PIT copy 435.

Assuming the PIT copy 440 is the last PIT copy made for the configuration shown in FIG. 4, the VDB file structures 450 are created for time point T2. When the structure 450 are created, the blocks V11, V12, . . . , V25 may be implemented as pointers to the actual database block that stores the data. For example, V11 represents the information in block F1 and since the block F1 was never updated during copies made at time T1 and T2, V11 points at F11. V12 represents the information in block F2 and since F2 was updated at time T1, V12 points at the block F22. Similarly, V13 corresponds to block F3 that was updated at time T2 and points at the block F33.

Since the structure 450 illustrated in FIG. 4 is a read/write structures, the virtual database system 130 is allowed to read from these structures as well as write to them. When the virtual database system 130 writes to a block Vij, space is allocated for the database block and the data of the corresponding database block copied to the space allocated. For example, if the virtual database system 130 writes to the block V11, space is allocated and block F11 copied to the allocated block. Hence the original copy of the block F11 is maintained as a read only copy and the virtual database system 130 is allowed to write to a copy of the appropriate database block created specifically for the virtual database system 130. This can be considered a lazy mechanism for creating copies of the database blocks that copies a database blocks only if the corresponding virtual database system 130 writes to the database block. Since the number of blocks that a virtual database system 130 writes to may be a small fraction of the total number of blocks associated with the VDB, the above structure stores the data associated with the VDB in a highly storage efficient manner. A database block that is not written to by virtual database systems 130 may be shared by several virtual database systems 130.

Deleting Objects in Database Storage System

The database storage system 100 maintains relationships between database infrastructure objects. For example, if a point-in-time copy of a source database is represented in the database storage system a relationship is maintained between a database infrastructure object representing the source database and a database infrastructure object representing the point-in-time copy. Similarly if a VDB is created using a source database, a relationship is maintained between a database infrastructure object corresponding to the source database and a database infrastructure object corresponding to the VDB. In an embodiment, the database storage system maintains these relationships as a graph representation in which nodes corresponds to database infrastructure objects and edges correspond to these relationships. If an edge corresponds to relationship between a target node representing a virtual database provisioned from a source node representing a database infrastructure object (e.g., a snapshot, another VDB, or a source database), the target node shares database blocks with the source node.

Figure 5:
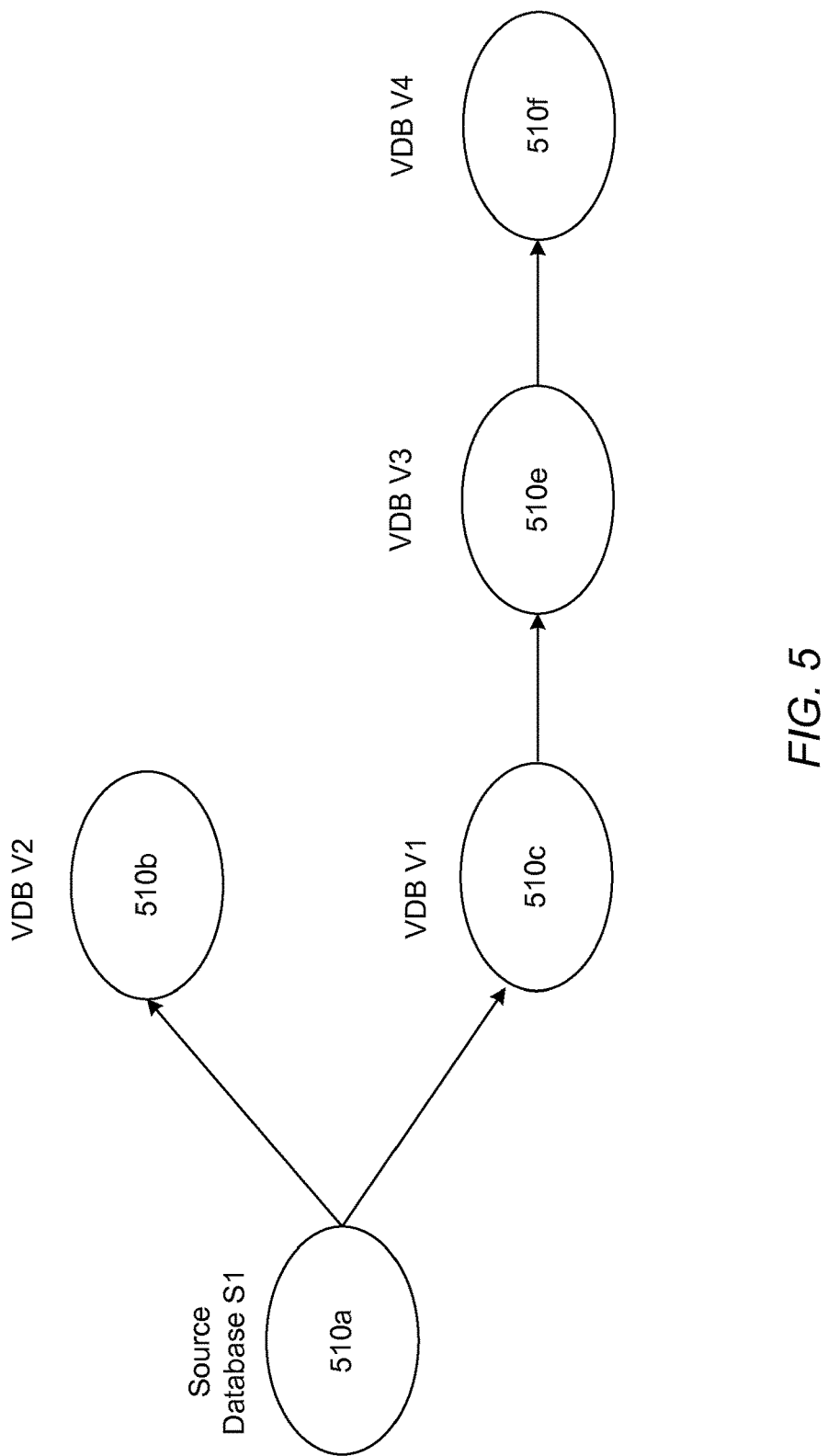
FIG. 5 shows a graph representation of the relationships between database infrastructure objects maintained by the database storage system according to an embodiment of the invention.

For example, FIG. 5 shows a graph representation of the relationships between database infrastructure objects maintained by the database storage system according to an embodiment of the invention. As shown in the graph representation of FIG. 5, database infrastructure objects (e.g., groups, containers, timeflows, or snapshots) are logically related to other database infrastructure objects by parent-child relationships thereby defining dependencies between pairs of database infrastructure objects. As shown in FIG. 5, database infrastructure object 510*a* corresponds to a source database S1. Database infrastructure objects 510*b* and 510*c* represent VDBs V1 and V2 respectively that are provisioned from the source database Si. Database infrastructure object 510*e* represents a VDB V3 provisioned from VDB V1 and database infrastructure object 510*f* represents a VDB V4 provisioned from VDB V3.

When a parent database infrastructure object is deleted (e.g., expunged by retention policy or by explicit user deletion), replication consistency of the child objects that depend from the parent needs to be maintained so as to preserve the capability of receiving future incremental updates to the child objects. In other words, a child object needs to be logically consistent even though its parent object has been deleted.

If a system administrator or a user deletes a database infrastructure object, for example, source database infrastructure object 510*a*, the database storage system 100 checks if there are any database infrastructure objects that depend on the deleted object. If there are no other database infrastructure objects that depend on the deleted object, the metadata as well as the data blocks corresponding to the deleted object may be marked as deleted and reused. However, if there are other database infrastructure objects that depend on the deleted object that are active (i.e., not deleted), the database storage system 100 retains information associated with the object being deleted.

In an embodiment, the database storage system 100 marks the object as deleted (or inactive) without actually deleting the data blocks associated with the object (or allowing the system to reuse the storage occupied by the data blocks). Alternatively, the database storage system 100 replaces the deleted object with a placeholder object that indicates that the original database infrastructure object is deleted (or marked inactive), however, the data blocks corresponding to the object cannot be reclaimed or reused because there are active database infrastructure objects that are using the information.

The deleted database infrastructure object can be at the source database storage system 100*a* or the target database storage system 100*b*. Furthermore, database infrastructure object can be at another database storage system 100 to which data is being replicated from one of the source database storage system 100*a* or the target database storage system 100*b*. In an embodiment, the source database storage system 100*a* includes a first database infrastructure object that is replicated as a second database infrastructure object on the target database storage system 100*b*. The source database storage system 100*a* receives a request to delete the first database infrastructure object. This request may be either received from a user, for example, a database administrator or generated as a result of a retention policy of database infrastructure objects. For example, the source database storage system 100*a* may have implemented a retention policy that specifies that a snapshot should be deleted after a period of time, for example, after a quarter or a month. Alternatively, a database administrator may send a delete request, for example, to delete a database infrastructure object representing a source database since the source database is renamed, moved to a different host, or removed. Since the second database infrastructure object is a replicated version of the first database infrastructure object, the source database storage system 100*a* sends a request to the target database storage system 100*b* to delete the second database infrastructure object.

Figure 6:
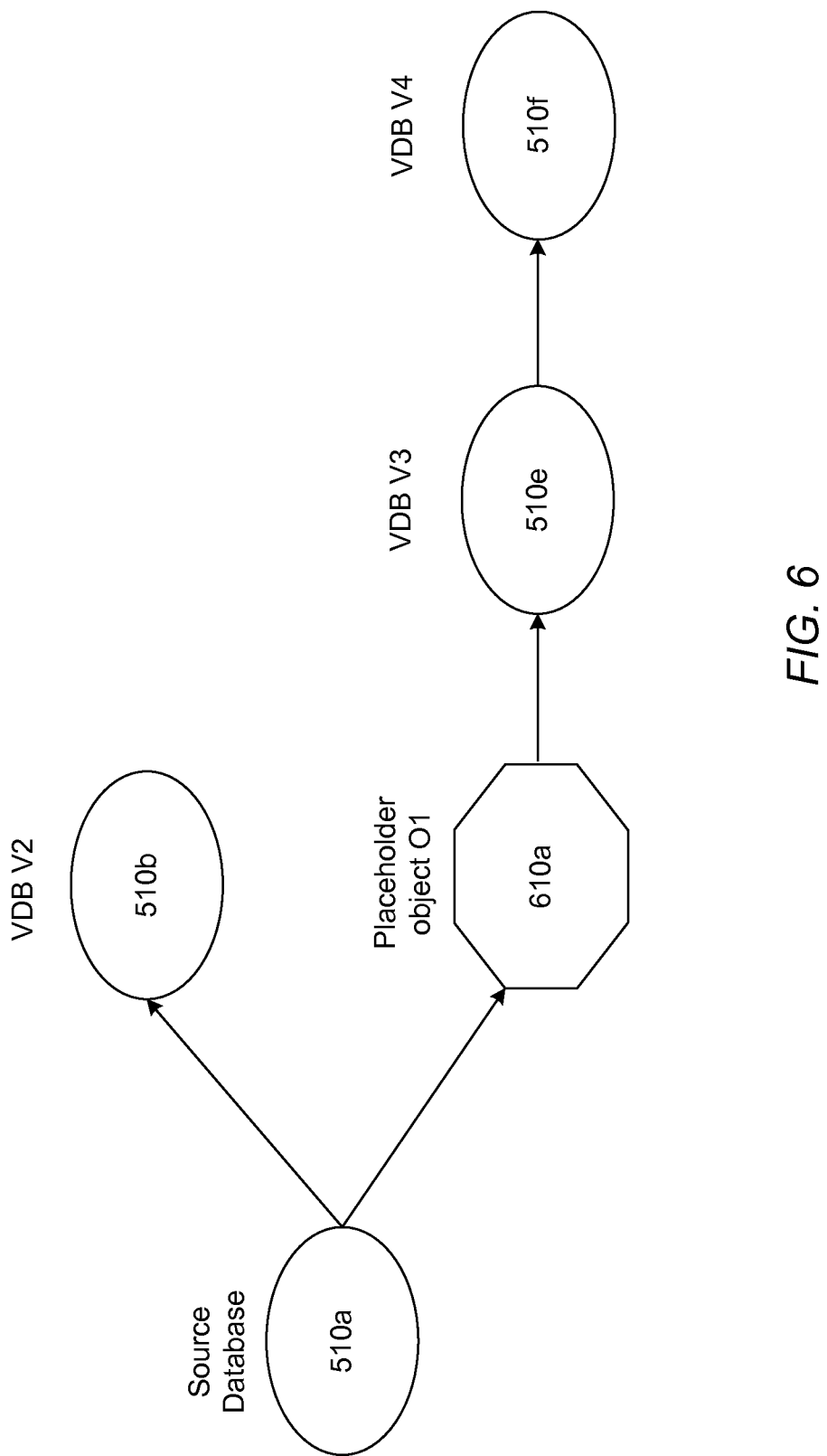
FIGS. 6-7 show a graph representation of relationships between database infrastructure objects shown in FIG. 5 with one or more of the objects deleted according to an embodiment of the invention.
Figure 7:
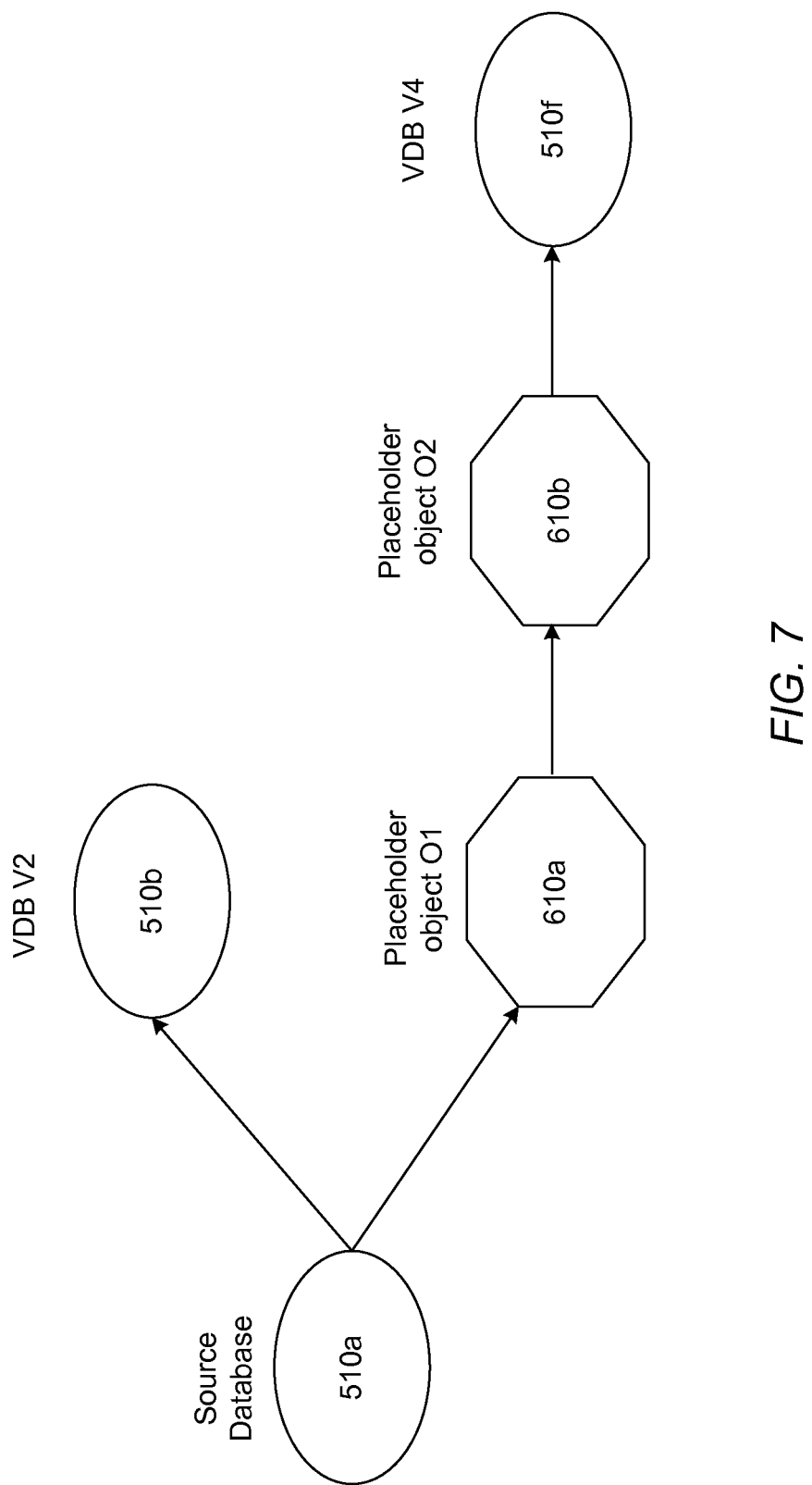

FIGS. 6-7 show a graph representation of relationships between database infrastructure objects shown in FIG. 5 with one or more of the objects deleted according to an embodiment of the invention. FIG. 6, corresponds to the graph representation of FIG. 5 in which the database infrastructure object 510*c* corresponding to VDB V1 is deleted. Since VDB V3 depends on the VDB V1, the database infrastructure object 510*c* is replaced with a placeholder object 610*a*. In an embodiment, a placeholder object represents a database infrastructure object that is marked inactive.

The placeholder object 610*a* is maintained so long as there are other database infrastructure objects (that are active) that depend on the placeholder object. However, if all objects that depend on the placeholder object are deleted (i.e., marked inactive as a result of a delete request), the placeholder object 610 is deleted, i.e., the data corresponding to the placeholder object is deleted or reused (or reclaimed).

If the database infrastructure objects 510*e* and 510*f* shown in FIG. 6 are also deleted, all database infrastructure objects that depend on the placeholder object 610*a* are deleted and the placeholder object 610*a* can be deleted. However, if there are other database infrastructure objects (for example, 510*f*) that depend on the object 510*e* of FIG. 6, the object 510*e* is replaced with a placeholder object 610*b* (e.g., as shown in FIG. 7). Both placeholder objects 610*a* and 610*b* are maintained until all database infrastructure objects that depend on the placeholder objects 610*a* and 610*b* are deleted.

Accordingly, the placeholder objects are used for tracking dependencies between database infrastructure objects and to determine when the data corresponding to a deleted object can be reused. It is possible that a large number of placeholder objects, for example, a chain of placeholder objects, is maintained for a long time because they all depend on one active object that is not deleted by the user. However, as soon as the active object is deleted, the entire chain of placeholder objects may be deleted and the storage corresponding to these objects is reclaimed or reused.

In an embodiment, the placeholder objects are not presented to a system administrator of the database storage system. For example, once a source database infrastructure object is deleted, the source database may not be presented to the system administrator. Accordingly, the system administrator would not be allowed to create a new VDB based on the deleted source database infrastructure object. The capabilities of the objects that depend on a deleted database infrastructure object may be limited. For example, a source database infrastructure object may be deleted such that a VDB dependent on the source database is still active. The source database infrastructure object is replaced with a placeholder object and database blocks corresponding to the source database infrastructure objects maintained while the VDB is active. However the VDB may not be able to refresh the data so as to reflect any changes in the production database corresponding to the source database. Accordingly, even though applications based on the VDB may be able to read or update the data of the VDB and change it, the VDB may not be able to refresh the data blocks based on changes in the production system corresponding to the source database. Other operations may also be allowed on the VDB, for example, the VDB can be started, stopped, and other VDBs created based on this VDB.

In an embodiment, whenever a database infrastructure object is deleted, the database storage system 100 checks if the deleted database infrastructure object is the last active database infrastructure object dependent on a placeholder object. If this was the last active database infrastructure object dependent on a placeholder object, the database storage system 100 determines all the placeholder objects that need to be deleted along with the active database infrastructure object being deleted.

Figure 8:
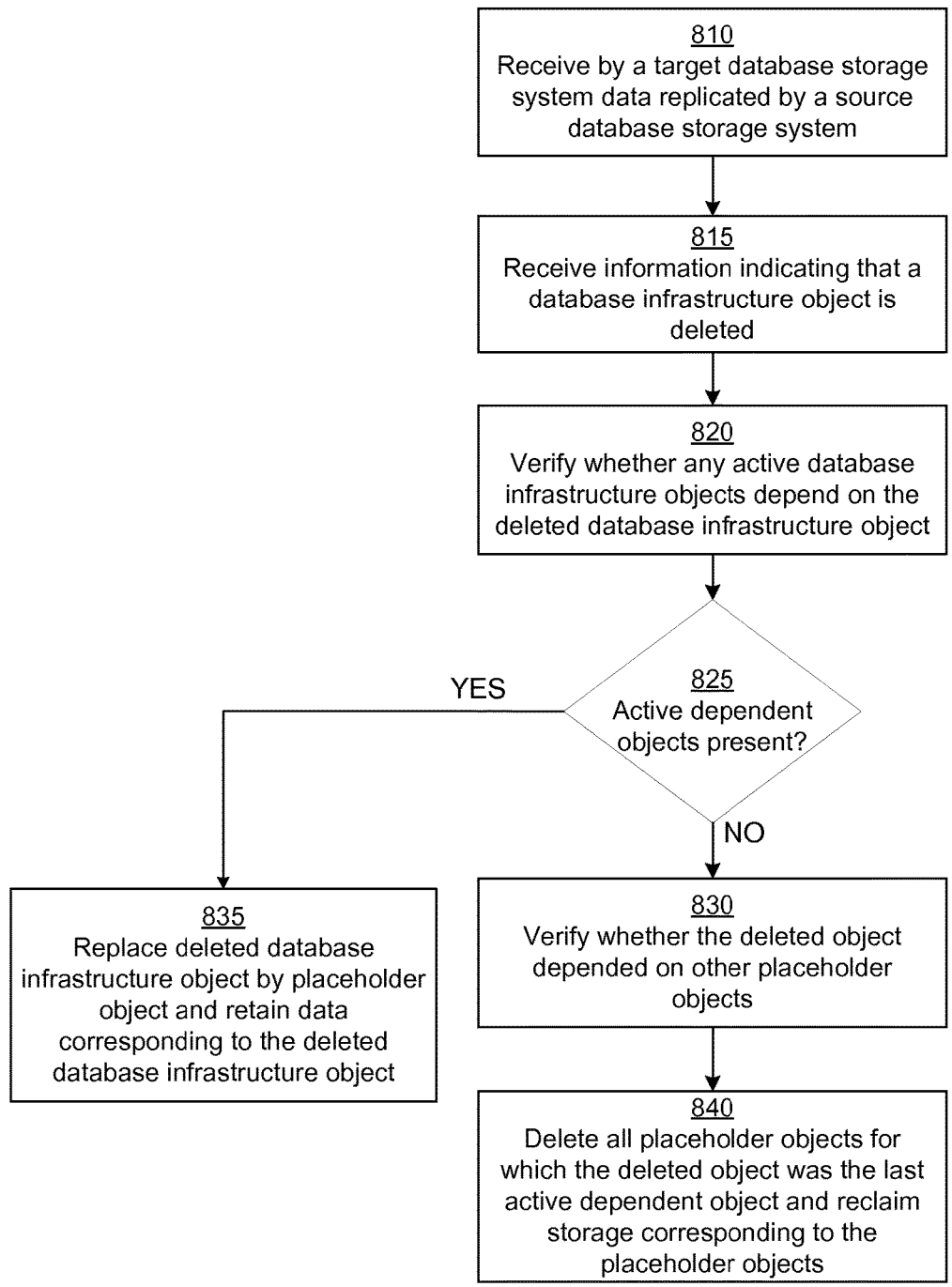
FIG. 8 is a flowchart of a process for deleting database infrastructure objects in a database storage system according to an embodiment of the invention.

FIG. 8 is a flowchart of a process 800 for deleting database infrastructure objects in a database storage system according to an embodiment of the invention. Database storage system 100 replicates (810) data from a source database storage system (e.g., production database system 110) to a target database storage system. Database storage system 100 receives (815) information indicating that a database infrastructure object is deleted (e.g., database infrastructure object 510c corresponding to VDB V1 is deleted as shown in FIGS. 5-6).

Database storage system 100 verifies (820, 825) whether any active database infrastructure objects depend on the deleted database infrastructure object. Responsive to determining that at least one database infrastructure object depends on the deleted database infrastructure object, database storage system 100 replaces (835) the deleted database infrastructure object by a placeholder object and retains data corresponding to the deleted database infrastructure object. In some embodiments, database storage system 100 maintains a placeholder object indicating that the data corresponding to the deleted object is saved. For example as explained with reference to FIGS. 5-6, since VDB V3 depends on VDB V1, the database infrastructure object 510c is replaced with a placeholder object 610a.

Responsive to determining that there are no database infrastructure objects that depend on the deleted object, database storage system 100 verifies (830) whether the deleted object depended on other placeholder objects. Database storage system 100 deletes (840) all placeholder objects for which the deleted object was the last active dependent object and reclaim storage corresponding to the placeholder object. In some embodiments, database storage system 100 reclaims the storage space corresponding to the deleted object and checks whether storage space corresponding to other placeholder objects on which the deleted object depends need to be reclaimed.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for remote provisioning. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for remote provisioning of virtual databases, the method comprising:

storing on a source database storage system, snapshots of data received from a source database, a snapshot representing a state of a source database at a point in time, wherein the snapshot shares database blocks with another snapshot associated with a different point in time;

replicating data from the source database storage system to a target database storage system, wherein replicating the data comprises, replicating a first database infrastructure object of the source database storage system to a second database infrastructure object of the target database storage system, wherein a database infrastructure object represents an entity associated with database blocks;

creating, by the target database storage system, one or more database infrastructure objects dependent on the second database infrastructure object and marking the created database infrastructure objects active, wherein a database infrastructure object dependent on another database infrastructure object shares database blocks with the other database infrastructure object;

in response to receiving a request to delete the first database infrastructure object at the source database storage system, deleting the first database infrastructure object by:

verifying whether any active database infrastructure object depends on the second database infrastructure object at the target database system, comprising, determining whether any database infrastructure object at the target database system depends on at least one of: the second database infrastructure object or another database infrastructure object dependent on the second database infrastructure object;

responsive to verifying that there is an active database infrastructure object dependent on the second database infrastructure object at the target database system, replacing the first database infrastructure object at the source database system with a placeholder object, wherein the placeholder object maintains the database blocks corresponding to the first database infrastructure object at the source database system and prevents reclamation of storage space of the database blocks associated with the first database infrastructure object; and responsive to the deletion of the first database infrastructure object by replacing the first database infrastructure object with the placeholder object at the source database system, limiting the ability of the active database infrastructure object at the target database system to perform one or more types of operations, while preserving the ability of the active data structure to perform one or more other types of operations associated with the active database infrastructure object; and responsive to determining that there are no active database infrastructure objects depending on the second database infrastructure object, reclaiming the database blocks corresponding to the first database infrastructure object.

2. The computer-implemented method of claim 1, wherein a database infrastructure object represents a virtual database, wherein the virtual database shares database blocks with one or more other virtual databases.

3. The computer-implemented method of claim 1, wherein a database infrastructure object represents a source database, wherein one or more virtual databases are provisioned using database blocks from the source database.

4. The computer-implemented method of claim 1, wherein a database infrastructure object represents a snapshot stored at the target database storage system, the snapshot representing data received from the source database storage system at a point in time.

5. The computer-implemented method of claim 1, further comprising:

identifying a third database infrastructure object that was replaced by a placeholder object, wherein the second database infrastructure object depended on the third database infrastructure object; and responsive to determining that there are no active database infrastructure objects depending on the second database infrastructure object, reclaiming the storage space used by database blocks corresponding to the third database infrastructure object.

6. The computer-implemented method of claim 1, wherein creating one or more database infrastructure objects dependent on the second database infrastructure object comprises creating a virtual database provisioned from the second database infrastructure object.

7. The computer-implemented method of claim 1, wherein creating one or more database infrastructure objects dependent on the second database infrastructure object comprises creating a virtual database provisioned from a third database infrastructure object, wherein the third database infrastructure object depends on the second database infrastructure object.

8. The computer-implemented method of claim 1, further comprising:

maintaining for each database infrastructure object, information identifying one or more other database infrastructure objects dependent on the database infrastructure object.

9. The computer-implemented method of claim 1, wherein the data received from a source database comprises changed blocks of the source database.

10. The computer-implemented method of claim 1, wherein creating one or more database infrastructure objects dependent on the second database infrastructure object comprises provisioning a virtual database, the provisioning:

receiving information identifying a point in time;

identifying a snapshot saved before the identified point in time; and creating the virtual database using database blocks from the identified snapshot.

11. The computer-implemented method of claim 1, wherein the request to delete the first database infrastructure object at the source database storage system is due to a retention policy associated with the first database infrastructure object.

12. The computer-implemented method of claim 1, wherein the request to delete the first database infrastructure object at the source database storage system is received from a user.

13. The computer-implemented method of claim 1, wherein replicating data from a source database storage system to a target database storage system comprises:
transmitting changed database blocks stored at the source database storage system to the target database storage system, wherein changed database blocks comprise database blocks modified since a previous transmission of changed database blocks to the target database storage system.

14. The computer-implemented method of claim 1, further comprising:
maintaining a graph representation, wherein nodes of the graph represent database infrastructure objects and a first node has an edge to a second node if the second node represents a virtual database provisioned from the first node.

15. The computer-implemented method of claim 14, wherein verifying whether any database infrastructure object depends on the second database infrastructure object comprises traversing the graph from the node corresponding to the second database infrastructure object to determine if any node reachable from the node represents an active database infrastructure object.

16. The computer-implemented method of claim 1, wherein operations of the active database infrastructure object are limited such that a virtual database associated with the active database infrastructure object is unable to refresh data to reflect changes associated with the source database.

17. The computer-implemented method of claim 16, wherein the one or more other operations associated with the active database infrastructure object that are allowed includes: read operation, update operation, start operation, and stop operation.

18. The computer-implemented method of claim 16, wherein allowing one or more other operations associated with the active database infrastructure object comprises creating new virtual databases based on the active database infrastructure object.

19. A non-transitory computer readable storage medium storing instructions for:
storing on a source database storage system, snapshots of data received from a source database, a snapshot representing a state of a source database at a point in time, wherein the snapshot shares database blocks with another snapshot associated with a different point in time;
replicating data from the source database storage system to a target data base storage system, wherein replicating the data comprises, replicating a first database infrastructure object of the source database storage system to a second database infrastructure object of the target database storage system, wherein a database infrastructure object represents an entity associated with database blocks;
creating, by the target database storage system, one or more database infrastructure objects dependent on the second database infrastructure object and marking the created database infrastructure objects active, wherein a database infrastructure object dependent on another database infrastructure object shares database blocks with the other database infrastructure object;
in response to receiving a request to delete the first database infrastructure object at the source database storage system, deleting the first database infrastructure object by:
verifying whether any active database infrastructure object depends on the second database infrastructure object at the target database system, comprising, determining whether any database infrastructure object at the target database system depends on at least one of: the second database infrastructure object or another database infrastructure object dependent on the second database infrastructure object; and
responsive to verifying that there is an active database infrastructure object dependent on the second database infrastructure object at the target database system, replacing the first database infrastructure object at the source database system with a placeholder object, wherein the placeholder object maintains the database blocks corresponding to the first database infrastructure object at the source database system and prevents reclamation of storage space of the database blocks associated with the first database infrastructure object; and
responsive to the deletion of the first database infrastructure object by replacing the first database infrastructure object with the placeholder object at the source database system, limiting the ability of the active database infrastructure object at the target database system to perform one or more types of operations, while preserving the ability of the active data structure to perform one or more other types of operations associated with the active database infrastructure object; and
responsive to determining that there are no active database infrastructure objects depending on the second database infrastructure object, reclaiming the database blocks corresponding to the second database infrastructure object.

20. The non-transitory computer readable storage medium of claim 19, further comprising instructions for:
identifying a third database infrastructure object that was replaced by a placeholder object, wherein the second database infrastructure object depended on the third database infrastructure object; and
responsive to determining that there are no active database infrastructure objects depending on the second database infrastructure object, reclaiming the storage space used by database blocks corresponding to the third database infrastructure object.

21. The non-transitory computer readable storage medium of claim 19, wherein creating one or more database infrastructure objects dependent on the second database infrastructure object comprises creating a virtual database provisioned from the second database infrastructure object.

22. A computer system comprising:
a computer processor; and
non-transitory computer readable storage medium storing instructions for:
storing on a source database storage system, snapshots of data received from a source database, a snapshot representing a state of a source database at a point in time, wherein the snapshot shares database blocks with another snapshot associated with a different point in time;
replicating data from the source database storage system to a target data base storage system, wherein replicating the data comprises, replicating a first database infrastructure object of the source database storage system to a second database infrastructure object of the target database storage system, wherein a database infrastructure object represents an entity associated with database blocks;

creating, by the target database storage system, one or more database infrastructure objects dependent on the second database infrastructure object and marking the created database infrastructure objects active, wherein a database infrastructure object dependent on another database infrastructure object shares database blocks with the other database infrastructure object;

in response to receiving a request to delete the first database infrastructure object at the source database storage system, deleting the first database infrastructure object by:

verifying whether any active database infrastructure object depends on the second database infrastructure object at the target database system, comprising, determining whether any database infrastructure object at the target database system depends on at least one of: the second database infrastructure object or another database infrastructure object dependent on the second database infrastructure object;

responsive to verifying that there is an active database infrastructure object dependent on the second database infrastructure object at the target database system, replacing the first database infrastructure object at the source database system with a placeholder object, wherein the placeholder object maintains the database blocks corresponding to the first database infrastructure object at the source database system and prevents reclamation of storage space of the database blocks associated with the first database infrastructure object; and responsive to the deletion of the first database infrastructure object by replacing the first database infrastructure object with the placeholder object at the source database system, limiting the ability of the active database infrastructure object at the target database system to perform one or more types of operations, while preserving the ability of the active data structure to perform one or more other types of operations associated with the active database infrastructure object; and responsive to determining that there are no active database infrastructure objects depending on the second database infrastructure object, reclaiming the database blocks corresponding to the second database infrastructure object.

* * * * *

UNITED STATES PATENT AND TRADEMARK OFFICE
CERTIFICATE OF CORRECTION

PATENT NO. : 10,108,685 B2  
APPLICATION NO. : 14/326664  
DATED : October 23, 2018  
INVENTOR(S) : Matthew Benjamin Amdur and Eric Noah Schrock Page 1 of 1

It is certified that error appears in the above-identified patent and that said Letters Patent is hereby corrected as shown below:

In the Claims

Column 19, Claim 19, Line 50, please replace "a target data base" with --a target database--.

Column 20, Claim 22, Line 61, please replace "a target data base" with --a target database--.

Signed and Sealed this
First Day of October, 2019

Andrei Iancu
*Director of the United States Patent and Trademark Office*